US005675730A

United States Patent [19]

Perdue et al.

[11] Patent Number: 5,675,730
[45] Date of Patent: Oct. 7, 1997

[54] METHOD AND APPARATUS FOR EXTENSIBLE TYPE-SPECIFIC DATA PRESENTATION BY A DEBUGGER

[75] Inventors: Crispin S. Perdue, Los Altos; David W. Weatherford, Mountain View; Thomas Preisler, Morgan Hill, all of Calif.

[73] Assignee: Sun Microsystems, Inc., Mountain View, Calif.

[21] Appl. No.: 499,715

[22] Filed: Jul. 7, 1995

[51] Int. Cl.$^6$ ................................................. G06F 11/34
[52] U.S. Cl. ................................. 395/183.14; 395/701
[58] Field of Search ......................... 395/183.01, 183.14, 395/700, 100, 101, 118; 364/275.5, 267.91

[56] References Cited

U.S. PATENT DOCUMENTS

| 4,885,717 | 12/1989 | Beck et al. | 364/900 |
|---|---|---|---|
| 4,943,968 | 7/1990 | Hirose et al. | 395/183.14 |
| 5,075,847 | 12/1991 | Fromme | 395/700 |
| 5,361,351 | 11/1994 | Lenkov et al. | 395/700 |
| 5,394,523 | 2/1995 | Harris | 395/162 |
| 5,432,942 | 7/1995 | Trainer | 395/700 |
| 5,485,569 | 1/1996 | Goldman et al. | 395/159 |
| 5,488,727 | 1/1996 | Agrawal et al. | 395/700 |
| 5,515,536 | 5/1996 | Corbett et al. | 395/700 |
| 5,560,009 | 9/1996 | Lenkov et al. | 395/700 |

OTHER PUBLICATIONS

Matthew Reilly "Presentation Tools for Performance Visualization: The M31 Instrumentation Experience" IEEE 1990, pp. 307–313.

*Primary Examiner*—Robert W. Beausoliel, Jr.
*Assistant Examiner*—Albert Decady
*Attorney, Agent, or Firm*—Erwin J. Basinski

[57] ABSTRACT

The present invention provides an economical, high performance, adaptable system and method for a type-specific data presentation by a development tool. In the preferred embodiment, one or more type-specific function name are found from the symbol table of the target program which might be able to display a data object. These type-specific function names are analyzed to determine if one and only one such name is able to display the data object and if so the found function name is used to call that function to display the data object. In the preferred embodiment the development tool is a debugger for C++ target programs.

13 Claims, 3 Drawing Sheets

METHOD AND APPARATUS FOR EXTENSIBLE TYPE-SPECIFIC DATA PRESENTATION BY A DEBUGGER

BACKGROUND OF THE INVENTION

1. Field of the Invention

This invention relates to the field of program display of data objects. More specifically, the invention relates to, discloses and claims mechanisms for display of data objects in programming languages (such as C and C++) wherein the data object typically does not contain any indication of its type.

2. Background

In modern computer system languages such as C, C++, Ada, Pascal etc., there exist data types which classify data values according to how they are stored in memory and what operations can be carried out on them. For example, in C++ like most languages, types whose values represent numbers are called arithmetic types and these are divided into integer types, whose values represent whole numbers, and floating types, whose values can contain decimal points. Most computers provide different sizes of memory for storing integer values. C and C++ provide four basic integer types: char, short, int, long. As one moves down this list, the types get larger in two senses: (1) more memory is required to store a value of that type, and (2) the type can represent a wider range of values. Floating point types are typically: float, double, long double. In general, a variable is a named memory location in which values can be stored. In languages like C++, the concept of variable is generalized into a device called a data object. A data object is a region of memory in which a value can be stored, and is characterized by its address, its name (if any), its type and its value. The type of a data object is the type of the values that can be stored in the object, and determines the size of the corresponding region of memory and specifies how the stored bit pattern is to be interpreted. For more detail about types and data objects see any text on the C or C++ language as for example "Learning C++" by Neill Graham, McGraw-Hill 1991, ISBN 0-07-023983-5. As programming languages developed, programmers were allowed to group together various data types into user-defined records (structs in C), but there was no way to restrict the functions that could manipulate the data or control access to the individual fields. The modern object oriented programming (OOP) languages like C++ enforce data integrity by bundling together the user-defined data structures plus the user-defined functions that are allowed to operate on them. No other functions are allowed to access the data. This mechanism extends strong typing from built-in data types to user-defined data types. This mechanism in C++ is called a class. A class is a type, like char, int, double and struct rec * are types. That is a class is a user-defined type with all of the operations on it. A class is often implemented as a struct of data, grouped together with functions that operate on the data. The compiler imposes strong typing, ensuring that these functions are only invoked for objects of the class, and that no other functions are invoked for the objects.

An extension of this class concept is the class library. The purpose of the class library is to provide data types, the internals of which the user/developer does not need to know. For example, a string is a sequence of characters, which in C++ is represented by a string literal, which is a series of characters enclosed by quotation marks. A C++ class library map provides a number of string-processing functions which the user does not need to define, but rather can use as is.

However, in modern debugger programs, wherein the user/developer frequently wishes to display the contents of a variable, string, array etc. according to its type, debuggers typically do not know how to display the variable properly. It is desirable that debuggers and similar programs have a capability that facilitates the display of data objects according to their type using the normal programming display commands, such as "print".

For example, consider a program "string-test" which contains a string s which contains the characters of the alphabet, i.e.

s=abcdefghijklmnopqrstuvwxyz

The exemplary program is

```
10   RWCString s;
11   char ch;
12   for (ch='a'; ch<='z'; ch++) {
13       s += ch;
14   }
15   printf("String is: %s ", (const char*)s);
16   return 0;
17   }
```

An attempt to display this string in a typical debugger such as the Sun Microsystems, Inc, dbx debugger portion of the Sun Product SPARCworks, would produce the following display:

```
(dbx) print s
s = {
    pref_        = 0x2ecc0
    initialCapac = 15
    resizeInc    = 16
    freeboard    = 15
}
``` where pref__0x2ecc0 denotes a pointer to the dynamically-allocated part of the RWCString;

initialCapac=15 denotes default initial capacity of storage allocation;

resizeInc=16 denotes space to add when the string outgrows its storage, and freeboard=15 denotes the maximum allowable unused space, none of which is information about the string s itself. With the present invention this problem would be solved by having the debugger execute (dbx) print -p s which would display the correct data, for example "s=abcdefghijklmnopqrstuvwxyz".

In the past, the problem has been addressed by using features of certain programming languages, where the data objects carry type information with them at run time and where the language itself supports both dispatching to a function according to the type of the object and defaulting if the type does not have a printing function defined specifically for it. One such approach was used by the LISP language and compiler system wherein it has a set of standard methods (supplied by the compiler's flavor system) for a standard protocol which all LISP message-receiving objects are assumed to understand. One method associated with the flavor "si:vanilla-flavor" is the method ":print-self stream prindepth slashify-p". In this case the flavor-name tells the system what type of object it is. (See pages 286–313 of the "Lisp Machine Manual" 4th edition July 1981, by Daniel Weinreb and David Moon, reprinted by Symbolics, Inc.) However, this capability is not available in more modern compilers and languages such as C, C++ etc.

Accordingly, the present invention is a system and method for a class library or application to provide a printing function for a type, that will tell a program tool such as a debugger what the tool should print for anything of that type. The invention provides a system and method for the tool to look-up the library- or author- or user-supplied function based on the type and to use that function to determine how to display the data of this type.

SUMMARY OF THE INVENTION

The present invention overcomes the disadvantages of the above described systems by providing an economical, adaptable system and method for a type-specific data presentation by a development tool. In the preferred embodiment, when a pretty print option is specified by a user for a particular data object, the development tool looks at the target program's symbol table to find any type-specific print functions available. If one or more of such print functions are found these are analyzed by performing argument type matching to determine whether there is one and only one of the found functions which can print the data object in question. If so the found function name is used to call that function to display the data object. In the preferred embodiment the development tool is a debugger for C++ target programs.

In one aspect of the present invention, a method is disclosed for producing a type-specific data presentation of an expression in a target program using a computer system.

In another aspect of the invention, a computer implemented method for producing a type-specific data presentation of an expression in a target program is disclosed wherein a type-specific function name is looked-up in the symbol table for the target program, and if one or more of such print functions are found these are analyzed by performing argument type matching to determine whether there is one and only one of the found functions which can print the data object in question, and if there is one and only such function, the found function name is used to call that function to display the data presentation.

In yet another aspect of the invention, an apparatus is disclosed for producing a type-specific data presentation of an expression in a target program.

In yet another aspect of the invention, a computer program product is disclosed having a computer usable medium having computer readable program code mechanisms embodied thereon configured to display a data object in a type-specific data presentation.

DESCRIPTION OF THE DRAWINGS

The objects, features and advantages of the system of the present invention will be apparent from the following description in which.

NOTATIONS AND NOMENCLATURE

Figure 1:
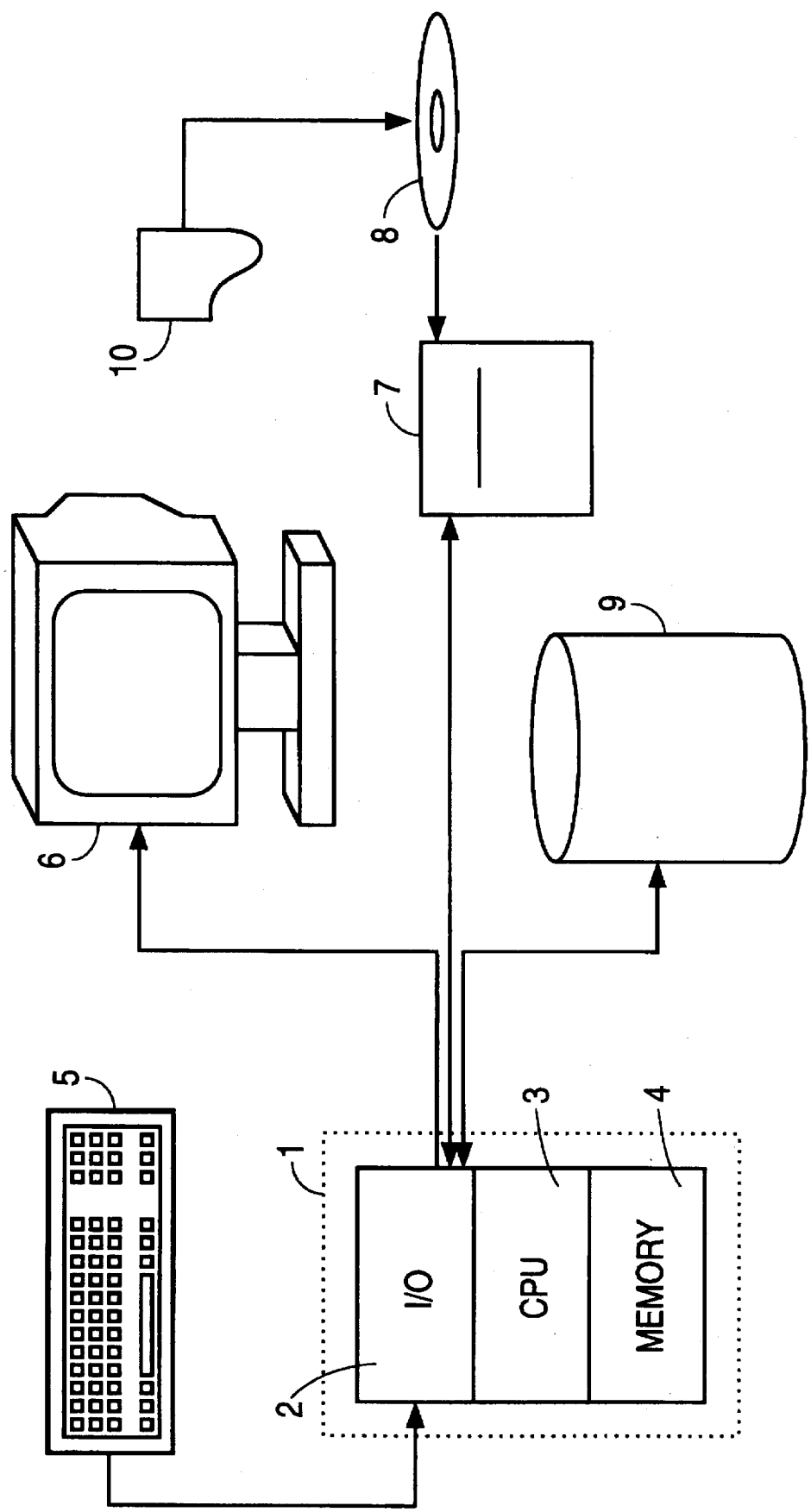
FIG. 1 illustrates a typical computer system configuration which may be used with the present invention.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Apparatus and methods for extensible type-specific data presentation by development tools, such as a debugger, are disclosed. In the following description, for purposes of explanation, specific instruction calls, modules, etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily. Similarly, in the preferred embodiment, use is made of uni-processor and multi-processor computer systems as well as the Solaris operating system, SPARCompiler ANSI C, and SPARCworks debugger, all of which are made and sold by Sun Microsystems, Inc. However the present invention may be practiced on other computer hardware systems and using other operating systems, compilers and development tools such as debuggers, as well.

The present invention is a system and method for "extensible type-specific data presentation" in a development tool in a computer system. The invention is described in more detail below. As a preliminary, however, the computer hardware environment of the present invention will now be described. It will be appreciated that the present invention may be easily adapted to function on any number of vendor's computer systems such as IBM, Hewlett Packard, DEC, MIPS, etc. and to function with target application programs to be debugged from various software vendors such as IBM, Hewlett Packard, DEC, MIPS, Microsoft, Novell, etc.

Operating Environment

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data.

Figure 2:
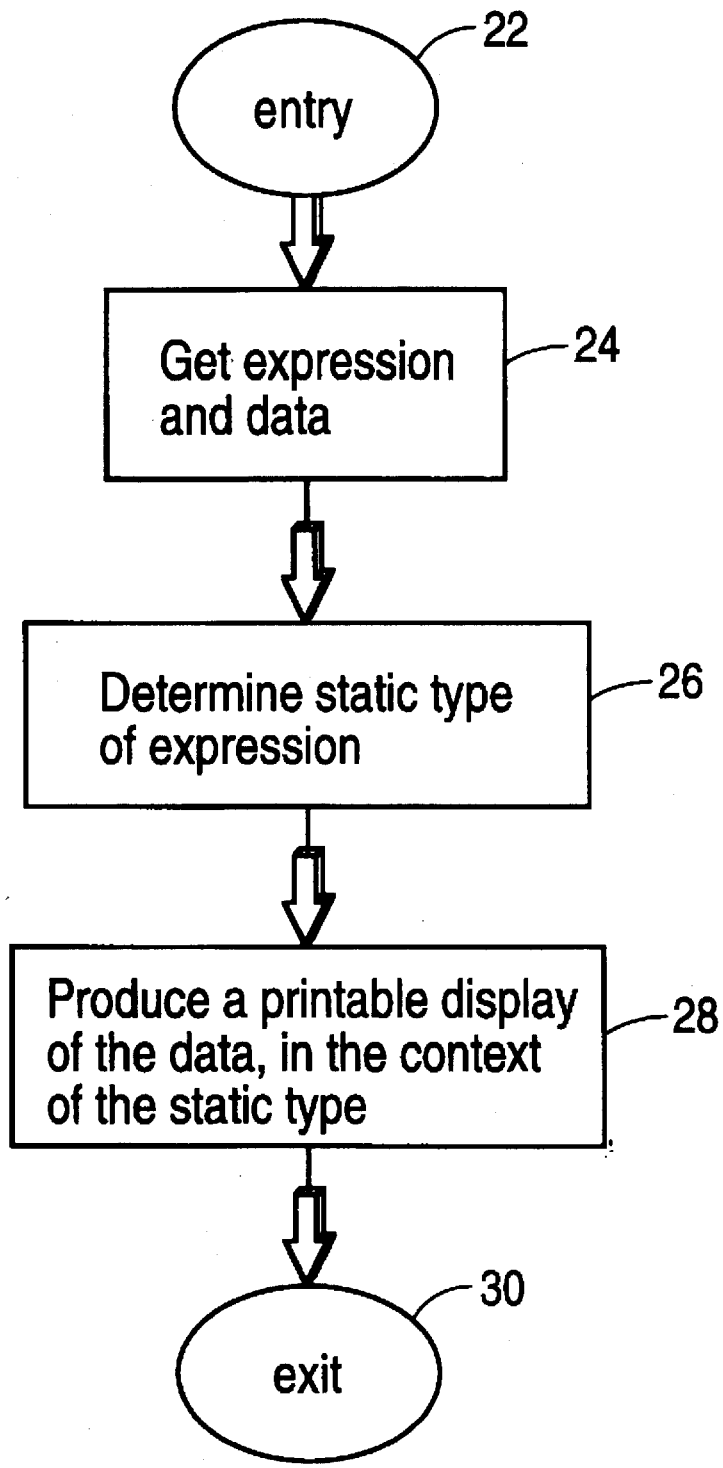
FIG. 2 is a flow diagram which illustrates an operation of a C++ tool such as a debugger at present.

FIG. 2 illustrates an exemplary development tool process 20, such as a debugger process, for printing or displaying a given variable or data object. Note that from the system viewpoint the concepts of printing or displaying on a screen are equivalent and we shall mean either henceforth by the terms "print" or "printing." In FIG. 2 when a print command is executed by the user/developer, entry 22 to this process occurs and the tool will get the name of the expression to be printed and the data corresponding to the name 24. The tool will determine the "static type" of the expression 26 and produce a printable display of the data in the context of the "static type" 28 and then exit 30. This process is determined by the C++ tool/debugger without the user being able to easily change it. In C++, class variables are declared as static. (See pages 309–314 of the aforementioned text "Learning C++" for additional details on static class members: class variables and functions.). Typically C++ developer tools like the SPARCworks debugger "dbx" only contain one way to use the static type for calculating the printable display of the indicated data and this typically does not produce the view the user/developer wants to see during a debugging session.

Type-Specific Data Presentation

Figure 3:
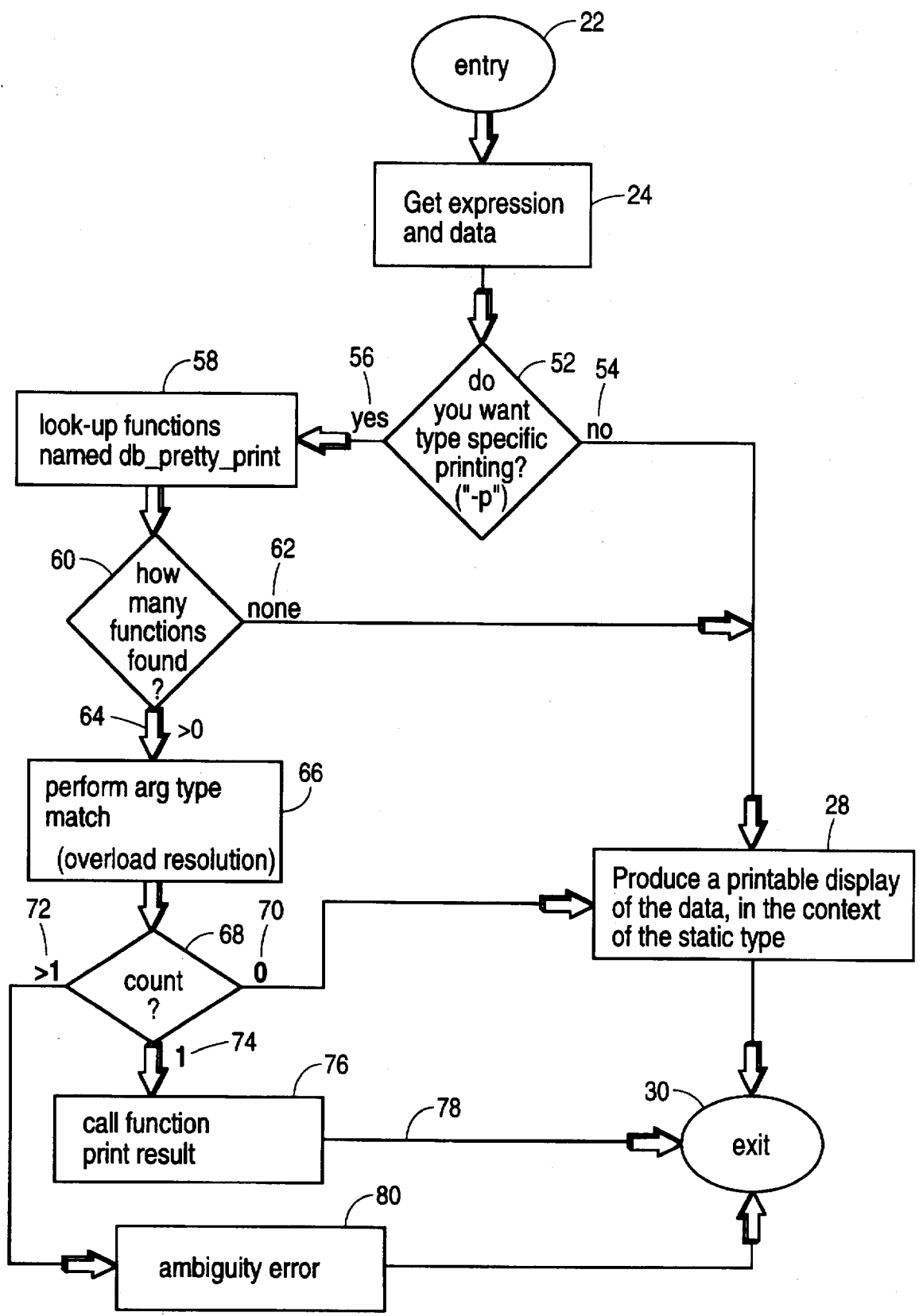
FIG. 3 is a flow diagram of the type shown in FIG. 2 which illustrates the addition of the present invention.

FIG. 3 illustrates the same print operation as shown in FIG. 2 but as modified to produce an "extensible type-specific" presentation of the data 50. That is, FIG. 3 illustrates a process by which a type-specific presentation of the data in question may be found if desired by the user and if the target application program being debugged or operated upon has a type-specific function for printing this type of data. In FIG. 3, as shown in FIG. 2, when a print command is executed by the user/developer, entry 22 to this process occurs and the tool will get the name of the expression to be printed and the data corresponding to the name 24. Unlike the present system as shown in FIG. 2, in the preferred embodiment the process now asks whether the user/developer desires type-specific printing 52. In the preferred embodiment, type-specific printing is indicated by the "–p" extension to the print command. If the answer is "no" 54 then the static type printable display is used as before 28 and the process exits 30. If however, the user desires type-specific printing 56 the process will attempt to find a type-specific function name using this data. This is done by looking through the symbol table for this target program and attempting to find all functions named "db_pretty_print" 58. If no such functions are found 62 then the static type printable display is used as before 28 and the process exits 30. If however, one or more print functions were found 64, argument matching is performed in order to resolve possible overload functions 66. Overloading allows multiple functions with the same name to be defined providing their argument lists differ sufficiently for calls to be resolved. Accordingly, if multiple print functions are found 64 as above, the arguments must be resolved in order to try to find the correct function for the target data. Overloading and argument matching for this resolution are well known in the art and are described in various texts on C++, as for example in Chapter 13, pages 307–339 of the text entitled "The Annotated C++ Reference Manual" by Margaret A. Ellis and Bjarne Stroustrup, Addison-Wesley Publishing Company, 1990 which is fully incorporated herein by reference. The specific algorithm used for argument matching in the preferred embodiment is shown as follows: The order of "goodness" of match, best to worst, is as follows.

1 Look for "exact" type matches, including "trivial" conversions. Given type T, a trivial conversion is any sequence of any of;

| | |
|---|---|
| T | => T& |
| T& | => T |
| T[ ] | => T* |
| T(args) | => (*T) (args) |
| T | => const T |
| T | => volatile T |

Among exact matches. we prefer not to convert T* to const T* or to volatile T*.

2. Look for "promotion" type matches; arguments which match if we allow the usual integral promotions on any non-matching parameters.

3. Look for "standard" type matches; allow standard conversions on any non-matching parameters, but not those conversions which require a temporary variable. Of the standard matches, if B is publicly derived form A, we prefer converting A* to B* rather than to void * or const void*. Also if C is publicly derived form B, converting C* to B* is better than to A*, and converting C& to B& is better than to A&.

4. Look for "temp" type matches; allow standard conversions requiring a temporary variable on any non-matching parameters.

5. Look for "users" type matches; allow user-defined conversions.

6. Look for "ellipsis" matches; allow matching of a parameter with an ellipsis.

Continuing in FIG. 3, after performing the overload resolution by argument matching the number of functions that match the target data is determined 68. If there are no matching print functions for the target data 70 then the static type printable display is used as before 28 and the process exits 30. If there is exactly one matching function found 74 then that matching function is called to print the target data 76 and the program exits 30. If there are more than one matching functions 72 there is an obvious question as to which is the correct one for the target data and so an ambiguity error occurs 80 and the program exits 30.

The Preferred Embodiment

The above general process of the invention is now described in more specific exemplary detail. The fundamental principles of the invention are that the debugger has a command or commands (as they are declared in the program) for presenting data; the debugger knows the types of variables and expressions. The debugger defines conventions for naming of type-specific data display functions; the debugger is able to run code in the debuggee; and the debugger is able to determine what functions are defined in the debuggee, and what the types of their arguments (and perhaps return values) are. The Sun Microsystems debugger ("dbx") can look for a function with appropriate name and argument types. If an appropriate function exists, the debugger can run it, passing the value of interest to it, and use its return value (e.g. a string) as a presentation of that value.

Applicants' preferred embodiment scheme allows type-specific printing to be defined by the implementor of the type or by the application program that uses the type. For example, (dbx) help prettypit If the '-p' flag is given to 'print', 'rprint', 'display', or 'inspect', dbx will invoke the ksh function 'prettyprint', which searches for a function in the target process with the name 'db__pretty__print' that takes three arguments: a pointer to the type of the expression, an integer, and a char *:

```
char *db__pretty__print(const Foo *, int flags, char *formatstring);
```

If found, dbx will call the function and print (or display) its return value; if not found, dbx will print (or display) the expression itself. The dbxenv variable 'output_pretty_print', if 'on', causes '-p' to be passed as the default; the user may use '+p' to override this behavior for one command.

'prettyprint' is defined in the system-wide dbx startup file (described in the dbx manual 'help startup' section). The value passed in the 'flags' argument will be a bit-wise OR of the following:

| | | |
|---|---|---|
| FVERBOSE | 0x1 | not currently implemented, always set |
| FDYNAMIC | 0x2 | -d |
| FRECURSE | 0x4 | -r |
| FFORMAT | 0x8 | -f (if set, "formatstring" is the <fmt> part) |
| FLITERAL | 0x10 | -l |

See 'help print' for the meaning of these flags.
(dbx)

Those skilled in the art will recognize that the present invention can be practised in any similar system. Alternative embodiments would include any scheme for getting to (i.e. computing) a type-specific function name, and trying to find a match of print functions in the symbol table for the target program, as long as the computed function name is consistent with whatever scheme is used for identifying such type-specific function names.

It will be appreciated by those skilled in the art that various modifications and alterations may be made in the preferred embodiments of the invention disclosed herein without departing from the scope of this invention. Accordingly, the scope of the invention is not to be limited to the particular invention embodiments discussed above, but should be defined only by the claims set forth below and equivalents thereof.

What is claimed is:

1. A method for producing a type-specific data presentation of an expression in a target program, using a computer which has a processor, memory, display, input/output devices, the method comprising the steps of:

providing a program development tool configured to be used in testing the target program;

providing a first program mechanism in the program development tool configured to look-up a type-specific function name in a symbol table for the target program;

providing a second program mechanism configured to determine how many type-specific functions were found in the symbol table and if no type-specific functions were found, then to produce a static type display of the expression;

providing a third program mechanism configured to recognize that the second program mechanism has found one or more type-specific functions, and to perform argument type matching to resolve overloaded functions in order to determine if any of the one or more type-specific functions found can display the expression, and if one such type-specific function which can display the expression is found to call that function to display the expression, and if more than one such type-specific functions can display the expression to return an error and exit; and under computer control producing a type-specific data presentation of an expression in a target program by calling said first program mechanism to look-up a type-specific function name in a symbol table for the target program, and if one or more type-specific function names are found in said symbol table calling said third program mechanism to determine whether one of said type-specific functions can produce a type-specific data presentation of said expression and if so to produce a type-specific data presentation of said expression.

2. The Method of claim 1 wherein the program development tool is a C++ development tool.

3. The Method of claim 2 wherein the program development tool is a C++ debugging tool.

4. The Method of claim 1 wherein the expression is a data object.

5. A computer implemented method for producing a type-specific data presentation of an expression in a target program, using a computer which has a processor, memory, display, input/output devices, the method comprising the steps of:

providing a program development tool configured to be used in testing the target program;

attempting to find a type-specific function name for displaying an expression designated by a user in a symbol table for said target program;

determining whether one or more type-specific function names were found which can produce a type-specific data presentation of the expression; and if one and only one such type-specific function name is found, using the one and only one found type-specific function name to call a related type-specific function to produce a type-specific data presentation of the expression to the user.

6. The method of claim 5 wherein the program development tool is a C++ development tool.

7. The method of claim 6 wherein the program development tool is a C++ debugging tool.

8. The method of claim 5 wherein the expression is a data object.

9. An apparatus for providing a type-specific data presentation of a data object by a development tool used for testing a target program, having a computer which has a processor, memory, display, input/output devices, the apparatus comprising:

a development tool in the computer memory;

a type-specific function name computing mechanism coupled to the development tool, and configured to compute a type-specific function name from a static type of the data object, said type-specific function name computing mechanism comprising:

a look-up device coupled to the development tool which can compare a type-specific function name with other type-specific function names in the target program and related symbolic data, said look-up device to find any type-specific function names in said related symbolic data;

an overload resolution device coupled to said look-up device which can perform argument type matching to determine if one and only one type-specific function name was found which can provide a type-specific data presentation of the data object; and a presentation device, coupled to the computer, which can display the data object in a manner defined by a type-specific function whose name was found to match the one and only one type-specific function name found by said overload resolution device, and which type-specific function can be used by the development tool for said display.

10. The apparatus of claim 9 wherein the development tool is a C++ development tool.

11. The apparatus of claim 10 wherein the development tool is a C++ debugger tool.

12. A computer program product comprising:

a computer usable medium having computer readable program code mechanisms embodied therein configured to display a data object in a type-specific data presentation, the computer readable program code mechanisms in said computer program product comprising:

computer readable code mechanisms configured to cause a computer to find a type-specific function name from a symbol table of a target program containing a static type of the data object;

computer readable code mechanisms configured to cause the computer to determine that one and only one type-specific function name can provide a type-specific data presentation for the data object; and computer readable code mechanisms configured to cause the computer to use the found one and only one type-specific function name to call a related type-specific function to produce a type-specific data presentation of the data object.

13. The computer program product of claim 12 wherein the computer readable code mechanisms are C++ mechanisms.

* * * * *